(12) United States Patent
Graham

(10) Patent No.: US 9,421,444 B1
(45) Date of Patent: Aug. 23, 2016

(54) SYSTEM AND METHOD FOR TRAINING BASEBALL FOOT POSITIONING IN HITTER BOX

(71) Applicant: Kyle Arthur Graham, Hurst, TX (US)

(72) Inventor: Kyle Arthur Graham, Hurst, TX (US)

(73) Assignee: Kyle Arthur Graham, Hurst, TX (US)

( * ) Notice: Subject to any disclaimer, the term of this patent is extended or adjusted under 35 U.S.C. 154(b) by 0 days.

(21) Appl. No.: 14/797,469

(22) Filed: Jul. 13, 2015

Related U.S. Application Data

(60) Provisional application No. 62/160,640, filed on May 13, 2015.

(51) Int. Cl.
   *A63B 69/00* (2006.01)
   *G09B 19/00* (2006.01)

(52) U.S. Cl.
   CPC ............ *A63B 69/0002* (2013.01); *G09B 19/00* (2013.01); *A63B 2069/0008* (2013.01)

(58) Field of Classification Search
   CPC ........... A63B 69/0002; A63B 69/0075; A63B 69/0013; A63B 69/3667; A63B 63/00; A63C 19/04
   USPC ......... 473/422, 417, 451, 452, 490, 499, 500, 473/218; D21/780, 698, 792, 706
   See application file for complete search history.

(56) References Cited

U.S. PATENT DOCUMENTS

| | | | | |
|---|---|---|---|---|
| 3,889,379 A * | 6/1975 | Cline | ................ | A63B 69/0002 473/452 |
| 3,979,116 A * | 9/1976 | Matchick | ........... | A63B 69/0002 473/452 |
| 4,510,692 A * | 4/1985 | Overholser | ........ | A63B 69/0002 473/452 |
| 5,076,580 A * | 12/1991 | Lang | .................. | A63B 69/0002 473/273 |
| 5,536,004 A * | 7/1996 | Wiseman | ........... | A63B 69/0075 473/452 |
| 5,607,150 A * | 3/1997 | Schnorr, III | ........ | A63B 69/3667 473/499 |
| 5,947,833 A * | 9/1999 | Alward | .............. | A63B 69/0002 473/452 |
| 6,440,004 B1 * | 8/2002 | Rodriguez | ......... | A63B 69/3667 473/273 |
| 6,893,365 B2 * | 5/2005 | Rathbun | ............. | A63B 69/0002 473/500 |
| 7,338,395 B1 * | 3/2008 | Hurley | ............... | A63B 69/0002 473/454 |
| 7,951,019 B1 * | 5/2011 | Lozado | ............. | A63B 69/0002 473/422 |
| 2006/0010705 A1 * | 1/2006 | Dettellis | ............ | A63B 69/0002 473/499 |
| 2008/0305893 A1 * | 12/2008 | Repko, Jr. | .......... | A63B 69/0002 473/451 |

* cited by examiner

*Primary Examiner* — Mitra Aryanpour
(74) *Attorney, Agent, or Firm* — Eldredge Law Firm; Richard Eldredge

(57) ABSTRACT

A baseball training system configured to instruct a proper foot placement of a hitter in a hitters box includes a home plate having a body that forms an interior cavity, a foot positioning device secured to the home plate and configured to engage within the interior cavity. The foot positioning device is configured to extend outwardly from the interior cavity to a predetermined position within the hitters box and to provide visual location of a desired foot position.

1 Claim, 7 Drawing Sheets

SYSTEM AND METHOD FOR TRAINING BASEBALL FOOT POSITIONING IN HITTER BOX

BACKGROUND

1. Field of the Invention

The present invention relates generally to baseball training systems, and more specifically, to a system configured for proper footing position in the hitters box.

2. Description of Related Art

Baseball is a long-loved sports activity played by persons of all ages. When batting, the player will position the feet in accordance to a comfortable stance; however, it should be understood that an improper stance will decrease the batting efficiency of the player. As shown in FIG. 1, a batting area 101 includes a home base 103 with two adjacent batter's boxes 105, 107. Two footprint outlines 109, 111 represent the positioning and orientation of the relative to plate 103. As shown, the footprint outlines 109, 111 are indicative of an improper stance that could reduce the bating performance of the player.

To overcome the above-referenced stance problem, the coach will typically realign the batter to the correct stance. This process is commonly repeated for younger and/or new players. The process is time consuming and has been found an ineffective method to teach an optimal stance position.

Accordingly, there is a long-felt need to provide a rapid and effective method to train a batter the proper stance within the batter's box.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
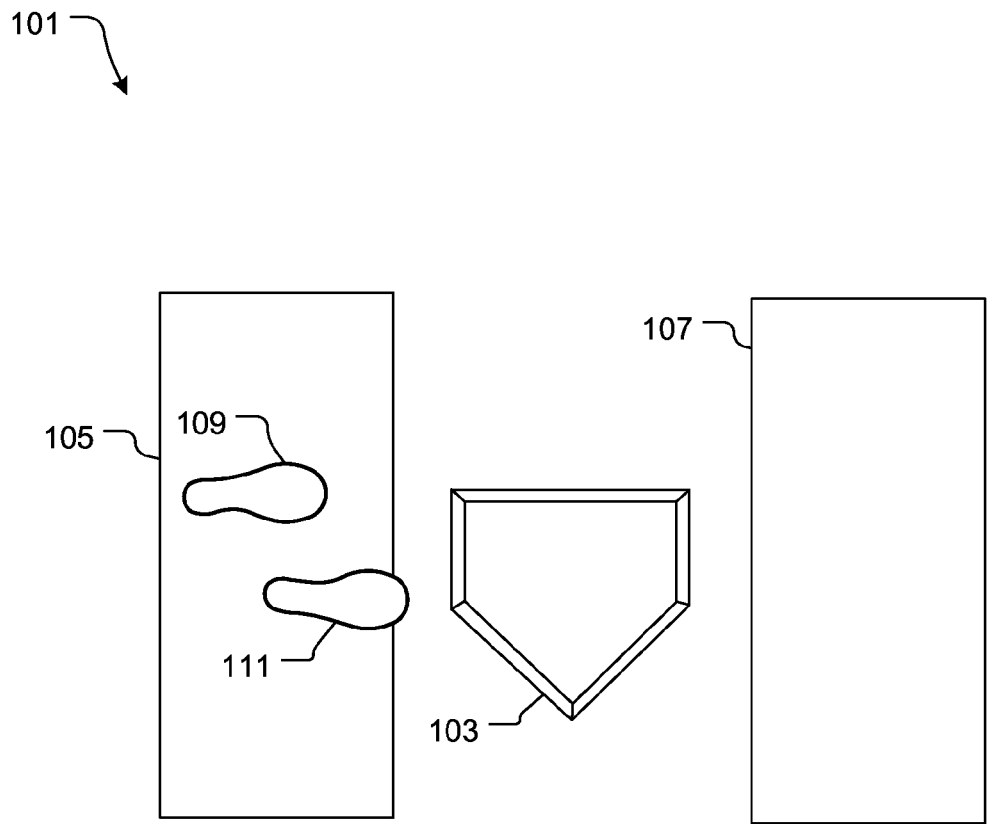
FIG. 1 is a top view of a conventional batting area.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional batting areas. Specifically, the system and method of the present application provides rapid and effective means to train proper footing to a baseball player while at bat. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
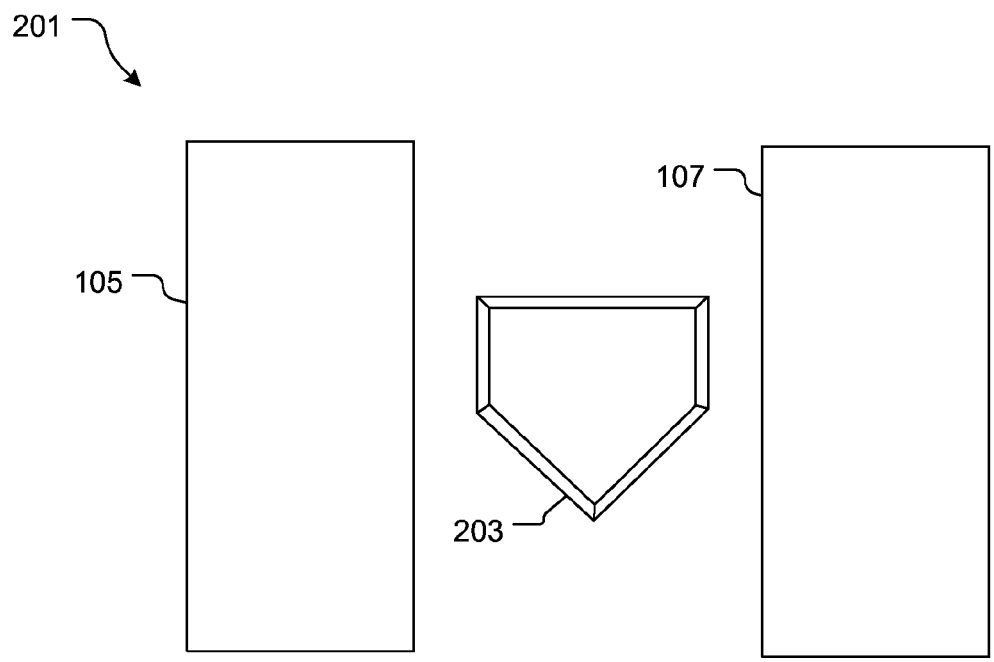
FIG. 2 is a top view of a training system and method of use in accordance with a preferred embodiment of the present application.
Figure 3A:
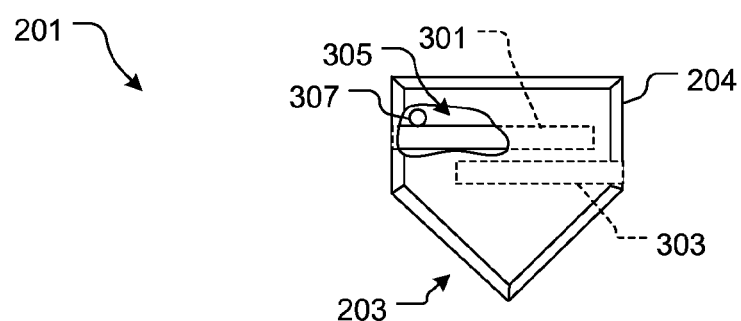
FIGS. 3A, 3B, and 3c are top views of the training system of FIG. 2.
Figure 3B:
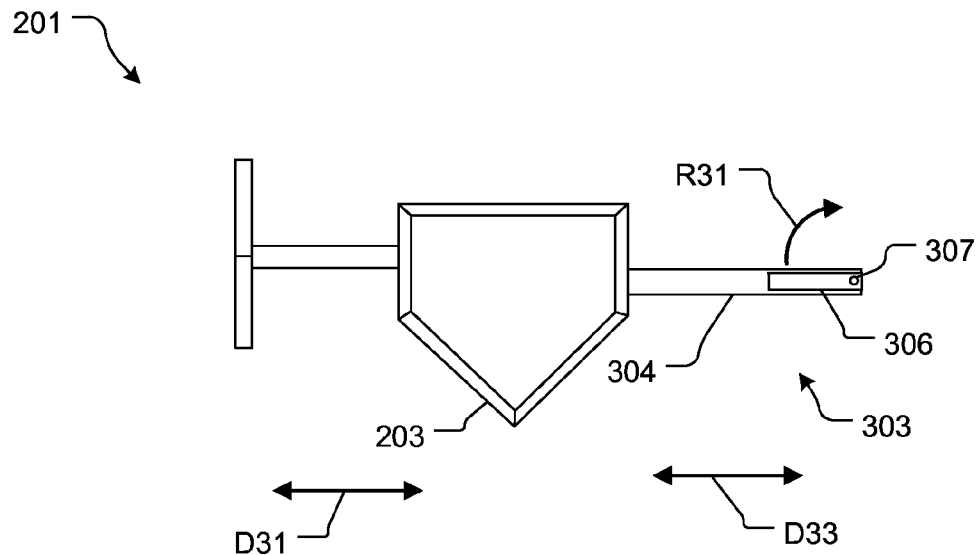
Figure 3C:
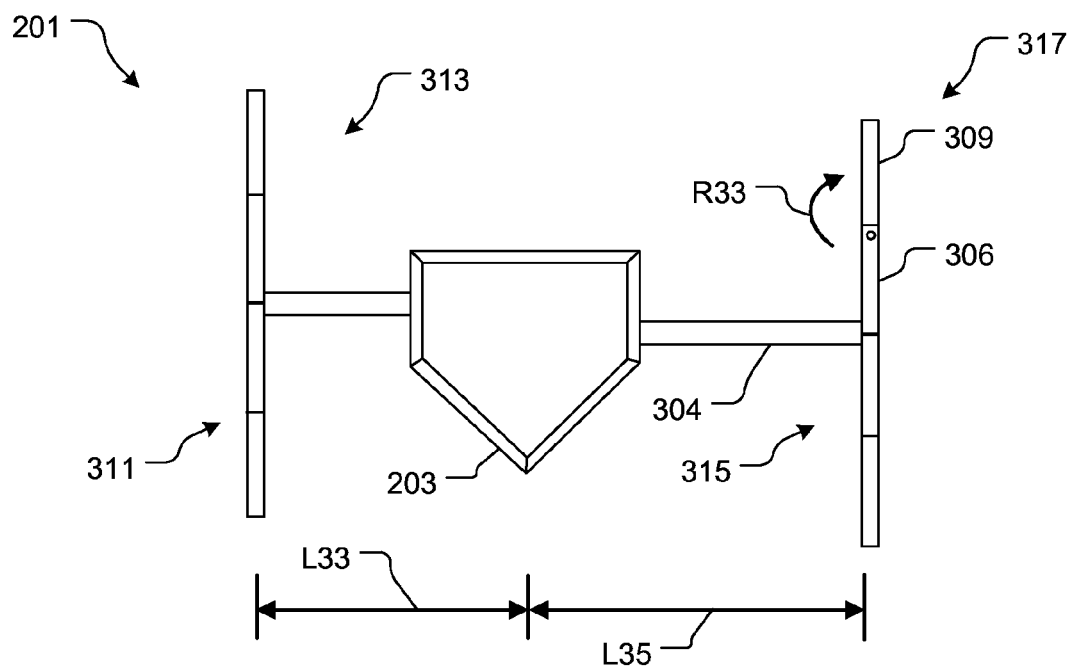

Referring now to the drawings wherein like reference characters identify corresponding or similar elements throughout the several views, FIGS. 2-3C depict front views of a training system and method of use in accordance with a preferred embodiment of the present application. It will be appreciated that system 201 overcomes one of more of the above-listed problems commonly associated with the conventional batting footing positioning.

In the contemplated embodiment, system 201 includes one or more of a home plate housing 203 having a body 204 that forms an internal cavity 305 configured to receive two foot positioning devices 301, 303 therein. As shown, the devices 301 are completely disposed within the cavity 305 when stored. This feature facilitates easy and rapid transport. When used, the devices 301, 303 with traverse relative to the housing 203 to an extended position. In the preferred embodiment, the devices 301, 303 are configured to slidingly engage within the cavity 305 and interlock with a locking device 307 for incremental movement and settings. However, in alternative embodiments, it is contemplated having devices pivot relative to housing 203 in lieu of sliding.

As shown in FIGS. 3A-3B, the process of assembling system 201 is shown. First, the devices 301, 303 are pulled from housing 203 in directions D31, D33 to a selective position. As shown in FIG. 3C, the positions are not always equal in length relative to the housing 203, as indicated by arrows L33, L35. Accordingly, the length from the housing 203 can be manipulated in accordance with a desired position, e.g., the size and stance of the player.

Device 303 is substantially similar in form and function to device 301. For the sake of clarity, one of the two devices is discussed in detail; however, both share the same features. As shown in FIG. 3B, the device 303 includes a retractable member 304 that pivotally engages with a first arm member 306 via a joint 307. During assembling, the arm member 306 pivots relative to retractable member 304 in a direction indicated by arrow R31.

As shown in FIG. 3C, a second arm member 309 is pivotally attached to first arm member 306 and extends the overall length of the elongated arm 317. During assembling, the arm member 309 pivots relative to arm member 306 in a direction indicated by arrow R33.

Figure 5:
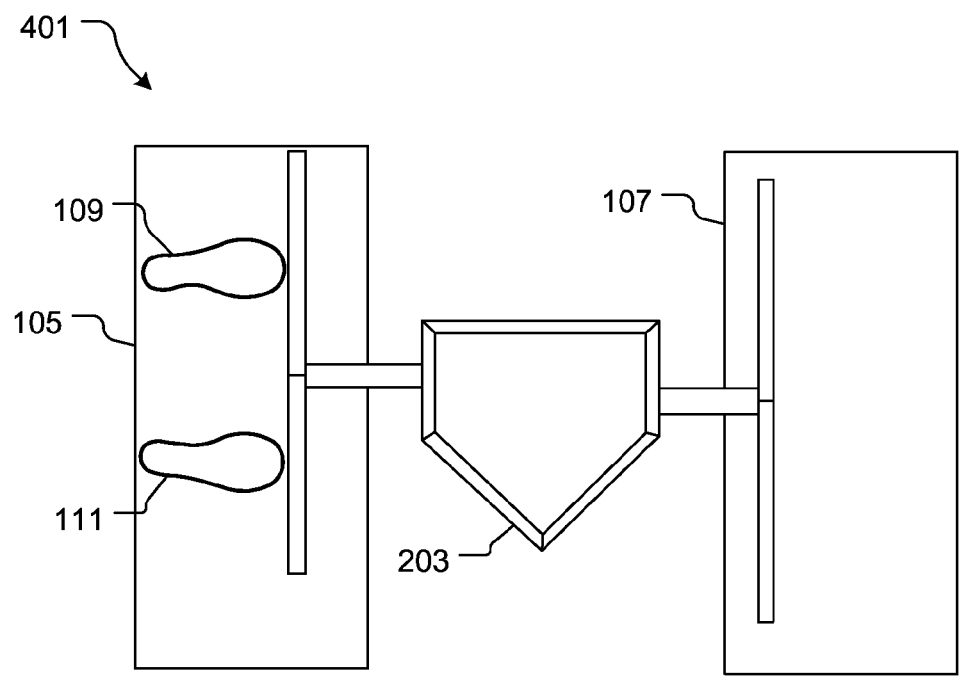

It will be appreciated that system 201 utilizes four arms: arm 313, 311, 315, and 317 to create two foot lines that the player uses for feet positioning, e.g., see FIG. 5, in the batters boxes 105, 107. Accordingly, the player now has a reference position via the arms to determine proper foot positioning.

Figure 4:
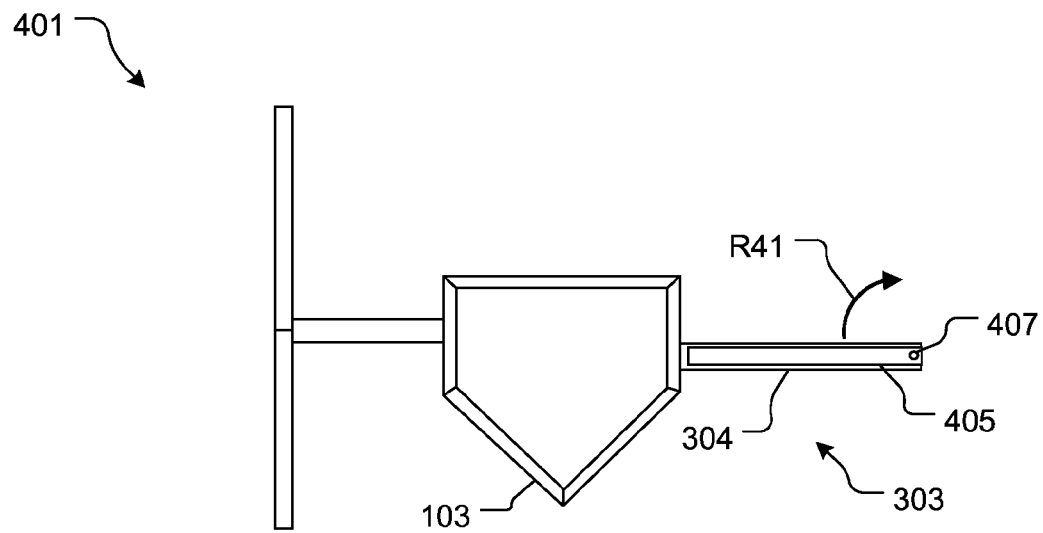
FIGS. 4, 5, and 6 are training systems in accordance with an alternative embodiments of the present application.

It will be appreciated that the arms could include a single arm member in lieu of a plurality, as shown in system 201. For example, FIG. 4 depicts an alternative embodiment substantially similar in form and function to system 201; however, in this embodiment the device 303 includes retractable member 304 with an arm 405 that pivots relative to retractable member 304 about a pivot joint 407 in a direction R41.

Figure 6:
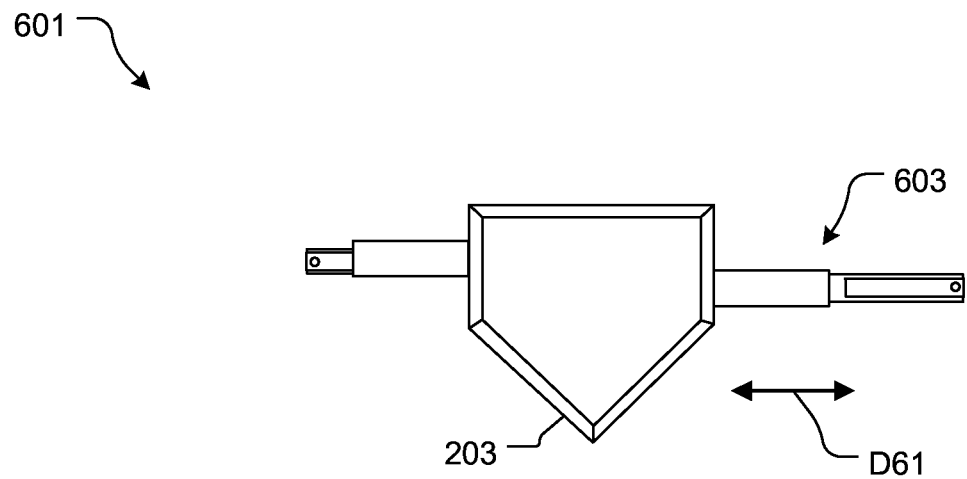
Figure 7:
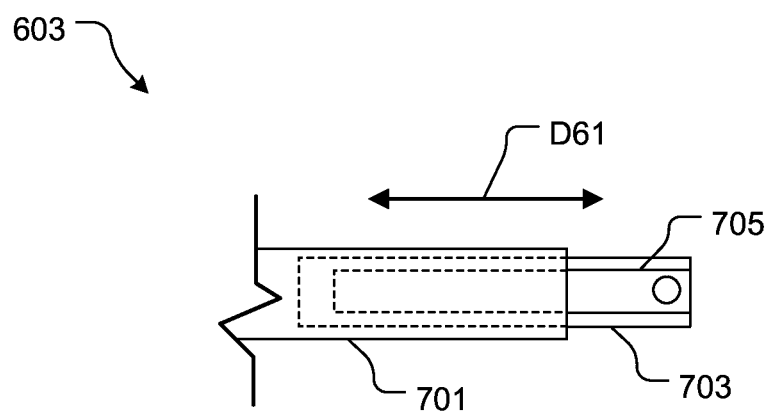
FIG. 7 is a top view of a retractable member of the system of FIG. 6.

Another contemplated embodiment includes the option of telescopically extending the elongated member. For example, FIGS. 6 and 7 illustrate a system 601 substantially similar in form and function to system 201 with the additional features of telescopically extending member 603 relative to housing 203. In the contemplated embodiment, member 603 includes a first member 701 having an interior area configured to slidingly receive a second smaller member 703 and arm member 705 therein, as indicated by arrow D61.

Figure 8:
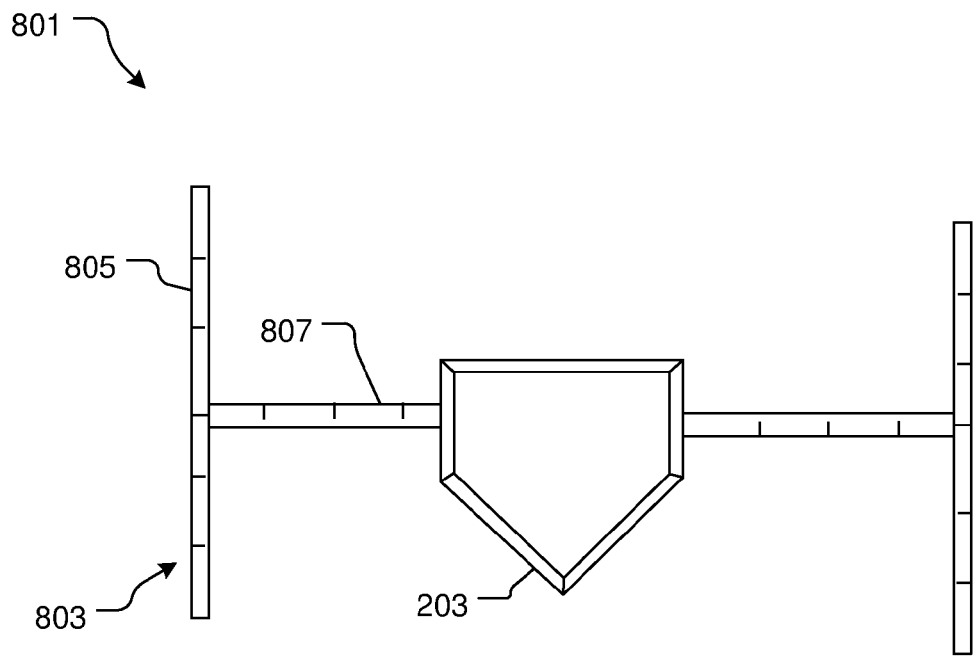
FIGS. 8, 9, and 10 are training systems in accordance with an alternative embodiments of the present application.
Figure 9:
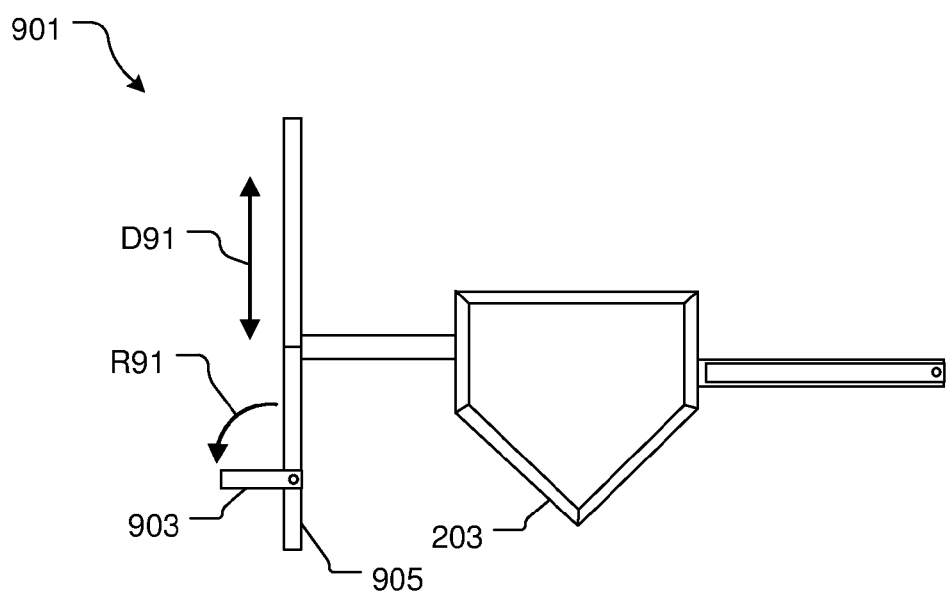
Figure 10:
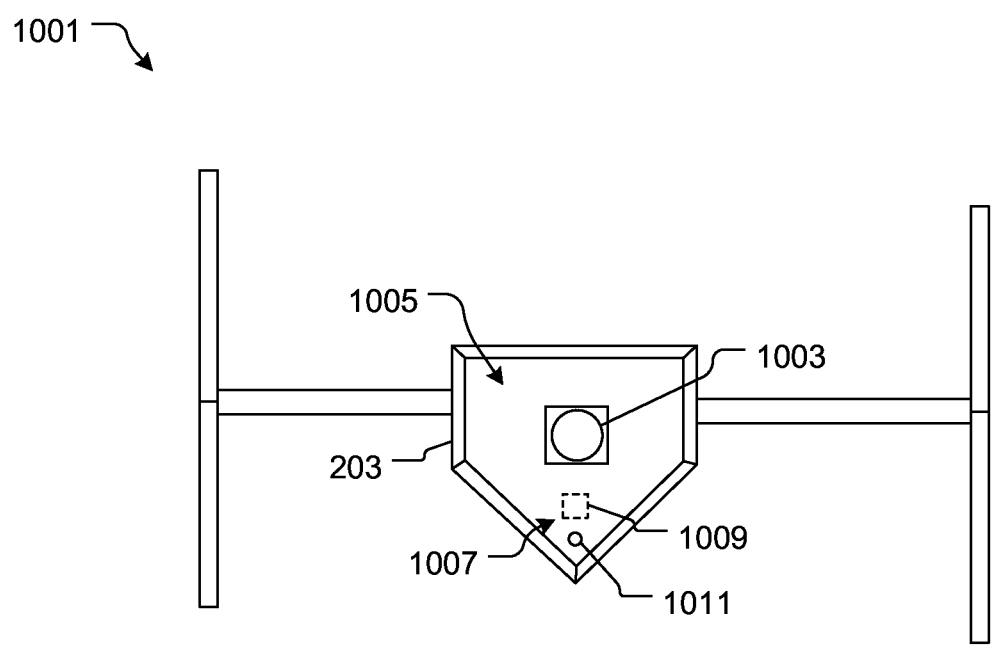

Referring now to FIGS. 8-10 different systems substantially similar in form and function to system 201 are shown. In FIG. 8, a system 801 includes a plurality of markers 803 on arm 805 and elongated member 807 for selective positioning of the arm and member relative to housing 203. Accordingly, the markers can be used as placement lengths of the arm and/or elongated member of to be used as foot placement. In FIG. 9, system 901 includes a foot positioning arm member 903 configured to pivotally and slidingly engage relative to arm 905 in directions D91 and R91. This feature allows the player to position the feet relative to the center of the housing 203. In FIG. 10, a system 1001 is shown having an attachment means 1003 secured to a top surface 1005 of housing 203 and configured to engage with an object to secured a ball at a height relative to housing 203. System 1001 is further provided with an alert system 1007 having a control system 1009 with a light display 1011. During use, the alert system 1007 could be used to notify that player when a correct and incorrect foot position is present.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A baseball training system configured to instruct a proper foot placement of a hitter in a hitters box, comprising:
    a home plate having a body that forms an interior cavity, the home plate is configured to provide a location wherein a baseball passes thereover;
    a foot positioning device secured to the home plate and configured to engage within the interior cavity, the foot positioning device having:
        a elongated rigid member configured to slidingly engage within the interior cavity of the home plate and extend to a position from the body of the home plate, the elongated rigid member having:
            a first elongated member section forming an interior area and configured to slidingly engage with the body of the home plate; and
            a second elongated member section configured to slide within the interior area of the first elongated member;
        a first arm pivotally attached to an end of the second elongated member section;
        a second arm pivotally attached to the end of the second elongated member section; and
        a foot positioning arm pivotally attached to the first arm and spaced apart from the end of the second elongated member section;
    wherein the foot positioning device is configured to extend outwardly from the interior cavity to a predetermined position within the hitters box; and
    wherein the foot positioning device is configured to provide visual location of a desired foot position.

* * * * *